N. Newman.
Corn Harvester.

No. 82,148.            Patented Sep. 15, 1868.

Witnesses:
Wm. A. Wogan
G. C. Cotton

Inventor:
N. Newman
per [Attorneys]

United States Patent Office.

NELSON NEWMAN, OF SPRINGFIELD, ILLINOIS.

Letters Patent No. 82,148, dated September 15, 1868.

IMPROVEMENT IN CORN-HARVESTERS.

*The Schedule referred to in these Letters Patent and making part of the same.*

TO ALL WHOM IT MAY CONCERN:

Be it known that I, NELSON NEWMAN, of Springfield, in the county of Sangamon, and State of Illinois, have invented a new and improved Corn-Harvester; and I do hereby declare that the following is a full, clear, and exact description thereof, which will enable those skilled in the art to make and use the same, reference being had to the accompanying drawings, forming part of this specification.

This invention relates to a new and improved device for picking the ears of Indian corn from the standing stalks, and it consists of a reciprocating cutter, fixed fingers, and yielding bars, all arranged in such a manner as to insure the ears being picked from the stalks without pulling up the latter, or without severing or cutting off the stalks, except in cases where they would otherwise be pulled up, the cutting of the stalks being preferable to the pulling of them up.

In the accompanying sheet of drawings—

Figure 1:
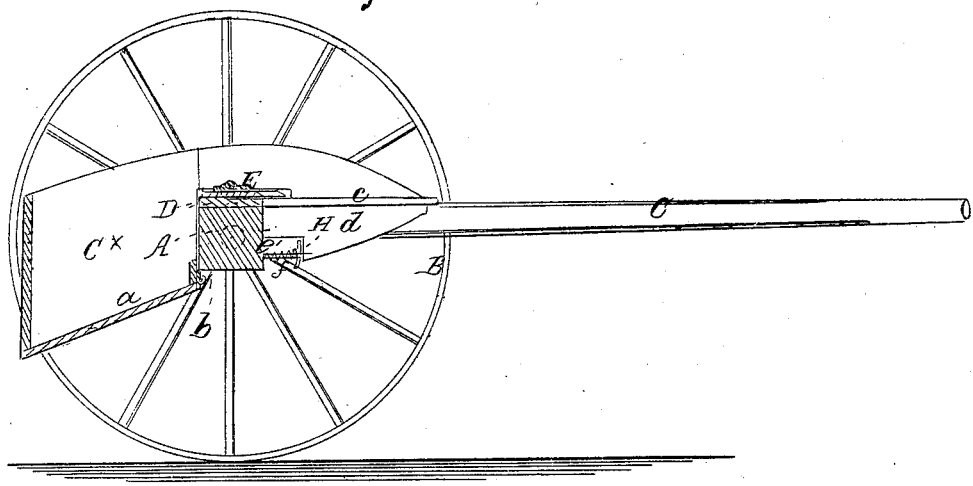
Figure 2:
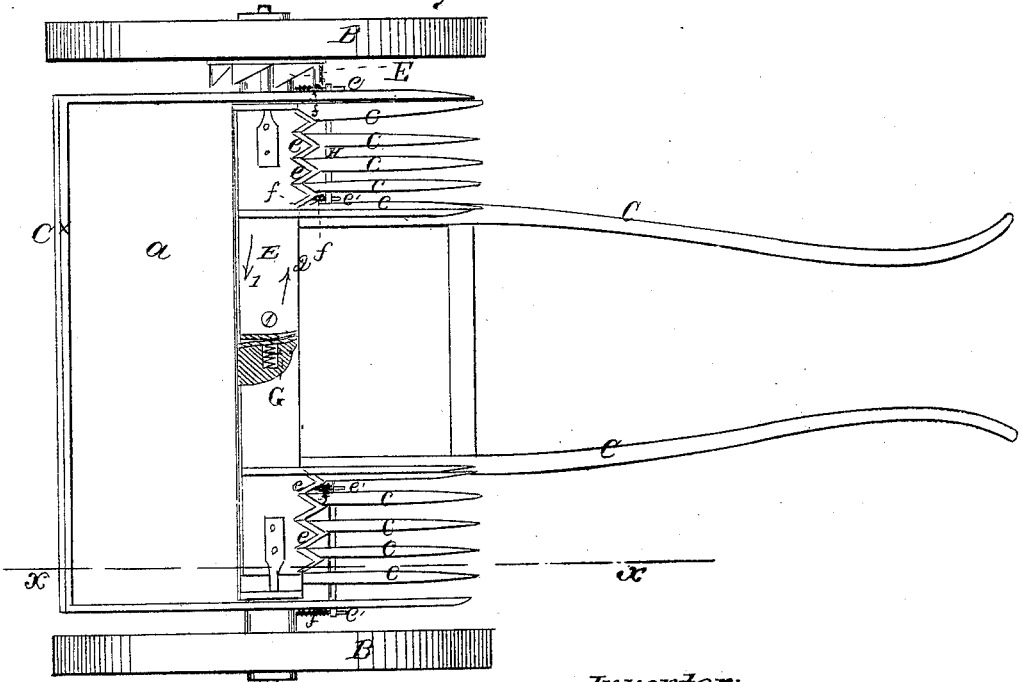

Figure 1 is a side sectional view of my invention, taken in the line $xx$, fig. 2.

Figure 2, a plan or top view of the same.

Similar letters of reference indicate corresponding parts.

A represents a bar or axle, having a wheel, B, on each end of it, and thills C C attached.

To the rear of the bar or axle A there is secured a box, $C^\times$, to receive the ears of corn, said box being provided with a bottom, $a$, hinged to the box adjoining the axle, as shown at $b$, so that the bottom may be let down when required, in order to discharge the corn.

To the top of the bar or axle A there is secured a metal plate, D, having a series of fingers, $c$, at each end, which rest on wooden supports, $d$, attached to the bar or axle.

The plate D extends the whole length of the bar or axle, and on the top of plate D the sickle-bar E is fitted, the latter being provided with teeth, $e$, near each end, which work over the fingers $c$.

This sickle-bar E is operated by a cam, F, on one of the wheels B, and a spring, G, the cam moving the sickle-bar in the direction indicated by arrow 1, and the spring throwing it back in the direction indicated by arrow 2.

The under sides of the finger-supports $d$, at their rear parts, are notched, to receive metal bars H, which rest on small guide-rods $e'$, having spiral springs, $f$, upon them, said springs having a tendency to keep the bars H at the front ends of the recesses or notches in the supports, as will be understood by referring to fig. 1.

The teeth $e$ of the sickle, and the fingers, $c$, at each side of the thills C, are shown clearly in fig. 2, the horse walking in the space between two rows of corn, and the fingers and teeth being in line with the two rows.

As the implement is drawn along, the standing stalks pass between the fingers $c$, and the ears of corn, which cannot pass down between the fingers, will be plucked off by the forward motion of the implement, and pass into box $C^\times$.

Occasionally, however, an ear which adheres firmly to its stalk, and will not yield, would cause the stalk to be eradicated, or pulled up by the roots.

This contingency I avoid by the cutters or teeth $e$, which sever the stalk before it can be uprooted.

The stalks, when the ears are being plucked off, rest or bear against the bars H, and the springs $f$ are designed to be sufficiently stiff to keep the stalks off or free from the teeth or cutters until there is danger of uprooting or pulling up the stalks, and then the bars H are designed to yield or give, and admit of the stalks coming in contact with the teeth $e$, which sever the stalk with the ear upon it.

The ears which thus firmly adhere to the stalks are comparatively few, but it is far more desirable to cut the stalks of the few tenaciously-clinging ears than to eradicate or draw said stalks up out of the ground with the roots upon them.

I do not claim broadly the reciprocating teeth or cutters $e$, nor the fingers $c$, for these parts have been previously used; but I do claim as new, and desire to secure by Letters Patent—

The yielding bars H, applied to the machine as shown, or in an equivalent way, to operate in connection with the teeth or cutters $e$ and fingers $c$, substantially as and for the purpose set forth.

NELSON NEWMAN.

Witnesses:
IRVING B. SAWYER,
HENRY P. GOODELL.